United States Patent [19]

Pelton

[11]  4,198,365
[45]  Apr. 15, 1980

[54] METHOD OF APPLYING PRODUCT BAGS IN AEROSOL BARRIER PACKAGES

[75] Inventor: Peter G. Pelton, St. Louis, Mo.

[73] Assignee: The Continental Group, Inc., New York, N.Y.

[21] Appl. No.: 2,031

[22] Filed: Jan. 8, 1979

[51] Int. Cl.² .............................................. B29C 17/00
[52] U.S. Cl. .................................. 264/249; 264/292; 264/313; B29D/31/00
[58] Field of Search ............... 264/249, 320, 322, 313, 264/314, 292; 29/421 R, 523, 512, 450, 451, 235; 222/94, 95, 386.5

[56] References Cited

U.S. PATENT DOCUMENTS

| 1,965,876 | 7/1934 | Bettis | 29/450 |
| 3,096,546 | 7/1963 | Edwards | 264/320 |
| 3,180,337 | 4/1965 | Smialowski | 29/450 |
| 3,490,651 | 1/1970 | Abplanalp | 222/94 |
| 3,526,955 | 9/1970 | Cilione | 29/512 |
| 3,557,275 | 1/1971 | Longshaw et al. | 264/320 |
| 3,828,977 | 8/1974 | Borchert | 222/386.5 |
| 4,045,860 | 9/1977 | Winckler | 29/451 |
| 4,124,675 | 11/1978 | McFarlane | 264/249 |

FOREIGN PATENT DOCUMENTS 287885  8/1966  United Kingdom .................. 222/386.5

Primary Examiner—W. E. Hoag
Attorney, Agent, or Firm—Charles E. Brown

[57]     ABSTRACT

A method of applying a bag to an aerosol type container wherein the product bag is formed of a stretchable material. An upper part of the product bag is first positioned on a tool, after which the product bag is inserted into the can until the upper part becomes seated on the curl which defines a valve cup receiving opening. Then the tool is actuated to effect a radial outward stretching and deformation of the bag upper part with the bag upper part being formed about the curl and thus secured in place relative to the curl. The tool is then removed, the product bag filled with the product, and the customary valve cup positioned.

9 Claims, 8 Drawing Figures

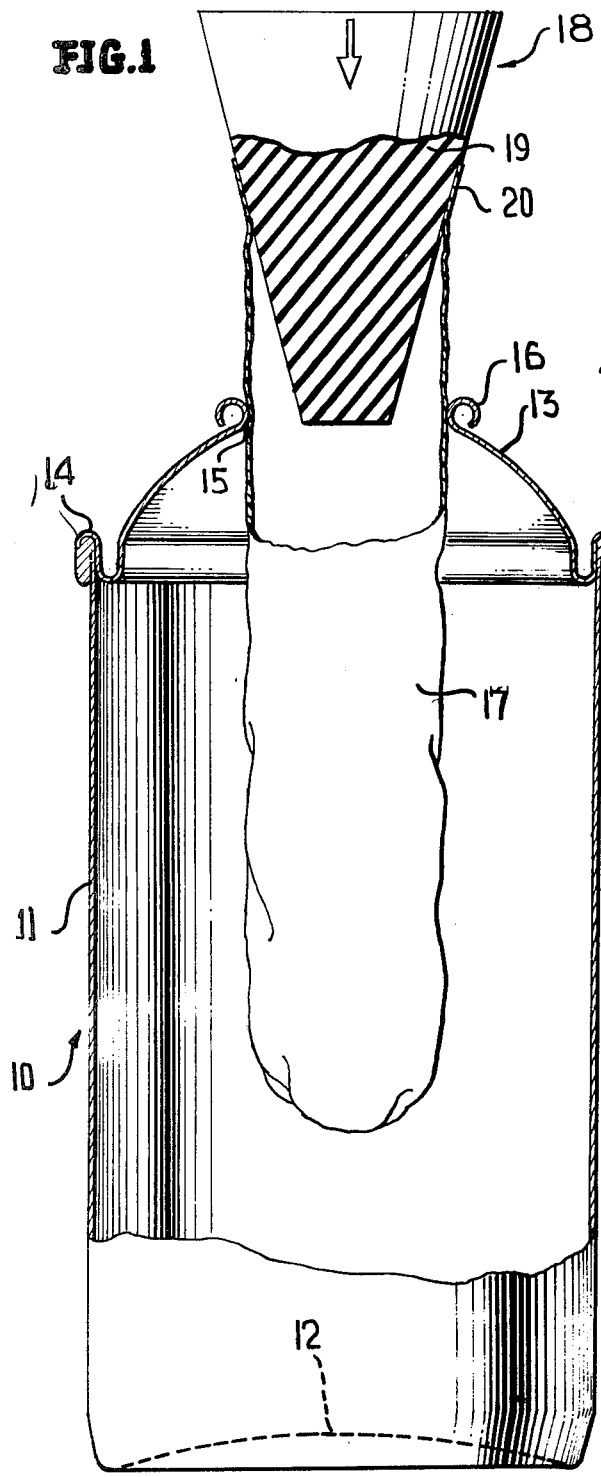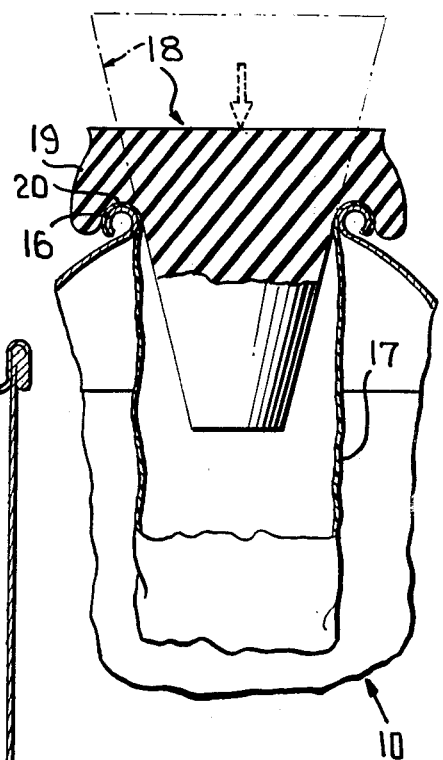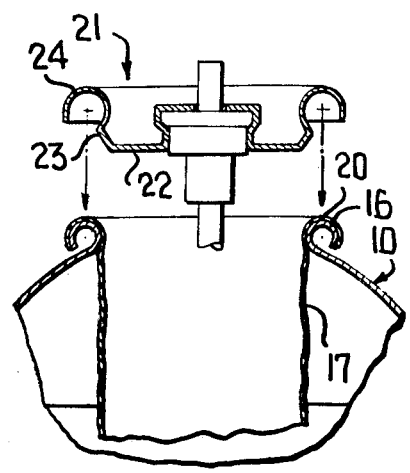

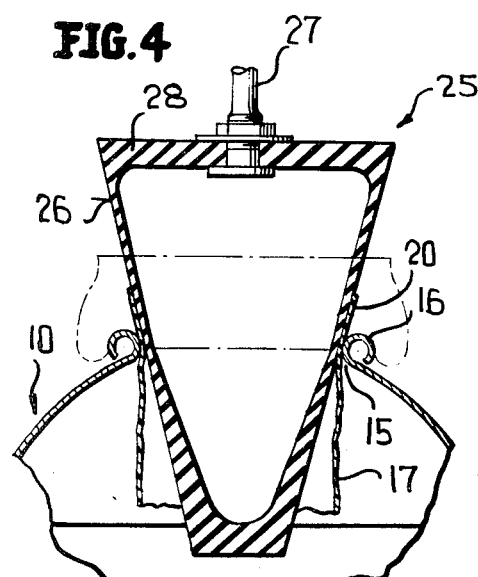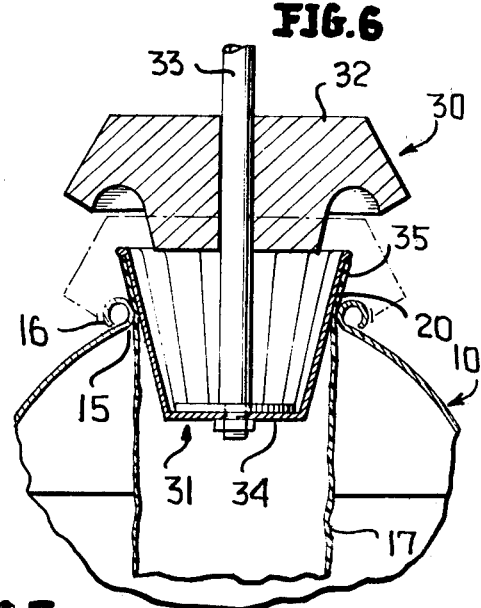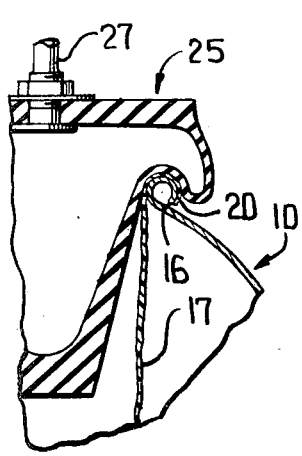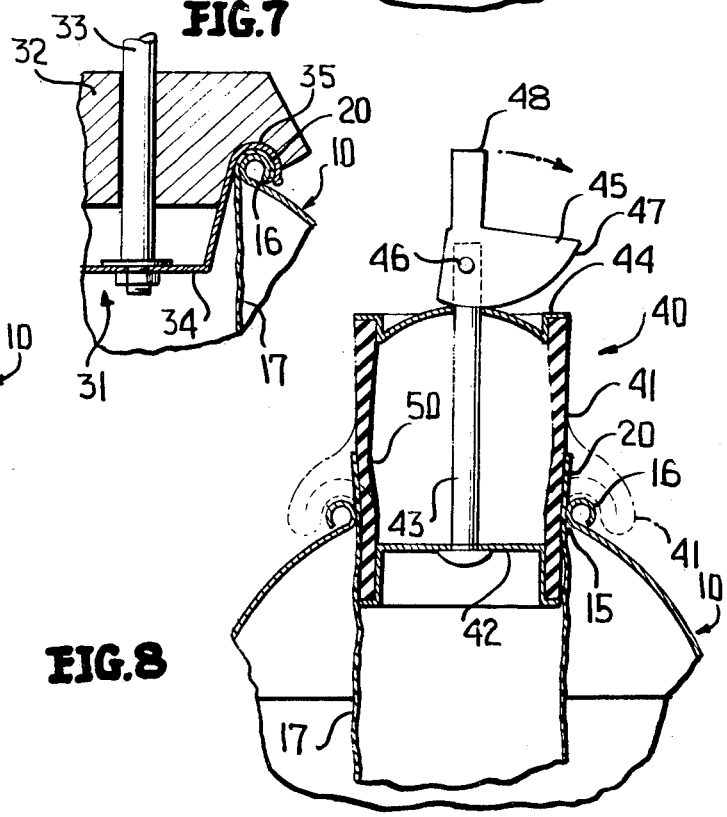

METHOD OF APPLYING PRODUCT BAGS IN AEROSOL BARRIER PACKAGES

This invention relates in general to new and useful improvements in the formation of aerosol containers, and more particularly to the attachment of product bags in aerosol barrier packages.

Aerosol barrier packages are in the form of a conventional container such as a can having a top end unit with a valve cup opening defined by a curl. The valve cup opening conventionally has a diameter on the order of one inch as compared to the normal diameter of a container on the order of two and one-half inches and greater. Several types of bags have been provided. This invention particularly relates to a bag which is formed of a stretchable material. The bag is formed of a plastics material film and can be of a laminated construction.

In accordance with this invention, a bag of a diameter corresponding to the diameter of the valve cup opening is provided and is mounted on a tool. The product bag is inserted through the valve cup opening and the upper part of the product bag is then stretched radially outwardly and down over the curl so as to retain the product bag in place within the can until the valve cup is applied, with the valve cup securing the product bag in place.

In accordance with this invention, a variety of tools may be employed.

With the above and other objects in view that will hereinafter appear, the nature of the invention will be more clearly understood by reference to the following detailed description, the appended claims, and the several views illustrated in the accompanying drawings.

IN THE DRAWINGS

FIG. 1 is an elevational view of a conventional aerosol can with parts broken away and with the product bag being applied by means of a first type of tool.

FIG. 2 is an enlarged fragmentary sectional view through the upper part of the can of FIG. 1, and shows the manner in which the tool is employed radially outwardly to stretch and deform the upper part of the product bag around the curl.

FIG. 3 is a fragmentary exploded sectional view showing a typical valve cup being applied to the can so as to complete the formation of the aerosol barrier package.

FIG. 4 is a fragmentary sectional view through the upper part of an aerosol can showing the bag being initially positioned utilizing a modified form of tool.

FIG. 5 is an enlarged fragmentary sectional view through the upper part of the container of FIG. 4, and shows the tool having radially outwardly stretched and deformed the upper part of the product bag around the curl.

FIG. 6 is a fragmentary sectional view similar to FIG. 4, and shows another form of tool being employed initially to position the upper part of the bag.

FIG. 7 is a fragmentary sectional view similar to FIG. 5, and shows the tool of FIG. 6 in its bag applying position.

FIG. 8 is still another fragmentary sectional view similar to FIG. 4, and shows yet another modified form of tool.

Referring now to the drawings in detail, reference is first made to FIG. 1 wherein there is illustrated an aerosol type can generally identified by the numeral 10. The can 10 includes a body 11 having the lower end thereof closed by a bottom wall 12. An aerosol type end unit 13 is secured to the upper end of the body 11 by means of a conventional seam 14. The end unit 13 has at the extreme top thereof a centrally located valve cup receiving opening 15 defined by an outwardly turned curl or curled lip 16.

The aerosol can 10, as described, is conventional and further description is believed to be unnecessary.

In accordance with this invention, the interior of the can 10 is to be separated into a product compartment and a propellant compartment. To this end there is provided a product bag 17 which is initially cylindrical and of a diameter corresponding to the diameter of the valve cup receiving opening 15. The product bag 17 per se is not a part of this invention. However, it is to be understood that the product bag is to be formed of a stretchable material and is preferably in the form of a plastics material film. If desired, it may be of a laminated construction. The bag 17 defines a first compartment for the product with the space around the bag 17 within the can 10 defining the propellant compartment.

This invention has to do with the insertion and positioning of the product bag 17 within the can 10.

In accordance with the embodiment of FIG. 1, a simple tool 18 is provided. The tool 18 is in the form of a tapered solid shaft of a low durometer (approximately 20) elastomeric material. The diameter of the solid shaft or plug 19 at midheight is substantially equal to the initial diameter of the product bag 17 and when the product bag 17 is slid up onto the plug 19, an upper end portion 20 of the product bag is outwardly flared and tightly adheres to the plug 19, as shown in FIG. 1.

The tool 18, with the product bag 17 thereon, is moved axially relative to the can 10 with the product bag 17 entering into the can through the valve cup receiving opening 15 as is clearly shown in FIG. 1. The tool 18 continues to move downwardly until the upper part 20 of the product bag is seated on the curl 16. At this time, due to the taper of the plug 19, the plug becomes wedged in the opening 15. Further downward pressure on the top of the plug 19 results in a deformation of the plug 19 in the manner shown in FIG. 2 so that the upper portion 20 of the product bag 17 is radially outwardly deformed and stretched and engaged about the curl 16. The product bag 18 is now interlocked with the curl 16 and the tool 18 may be readily removed by merely moving it axially with respect to the can 10.

If desired, a suitable adhesive may be applied to the exterior surface of the upper part 20 in advance of the application of the product bag 17 to the can 10. However, the deformation of the upper part 20 should be sufficient to retain the product bag in place until the valve cup can be inserted.

After a suitable product has been placed within the product bag 17, which may effect the radial outward expansion of the product bag within the can 10, a conventional valve cup, generally indentified by the numeral 21, is applied in a conventional manner as shown in FIG. 3. The valve cup 21 includes a base 22, an upstanding body 23 and a terminal curl 24. When the valve cup 21 is applied, the body 23 is radially outwardly expanded so as tightly to clamp the upper part of the product bag 17 against the curl 16. The upper part 20 of the product bag may also function to provide a seal between the valve cup and the bag.

Reference is now made to FIGS. 4 and 5 wherein a modified form of tool, generally identified by the numeral 25, is shown. The tool 25 is in the form of a tapered plug 26, but, as opposed to the plug 19 which is solid, the plug 26 is hollow. A suitable duct member 27 is connected to a top wall 28 of the plug 26 and opens into the interior of the plug 26.

As in the case of the tool 18, the plug 26 is proportioned so that at midheight it has a diameter generally corresponding to the diameter of the valve cup receiving opening 15. The upper part 20 of the product bag 17 is slid up over the tool 25 and is slightly outwardly expanded so as to be retained by the plug 26. The tool 25 is then utilized to push the product bag 17 into the can 10 in the same manner shown in FIG. 1. After the plug 26 wedges in the valve cup receiving opening 15, fluid under pressure is directed into the interior of the plug 26 with the result that the plug 26 is deformed in the manner shown in FIG. 5 so as radially outwardly to stretch and deform the bag upper part 20 around the curl 16 in generally interlocking relation therewith. After the bag upper part 20 has been so deformed, the pressure within the tool 25 may be released and the tool is removed with the bag upper part 20 remaining interlocked with the curl 16 and retaining the product bag 17 in place. Thereafter, the valve cup 21 is applied in the manner shown in FIG. 3.

In FIG. 6 there is illustrated still another form of tool generally identified by the numeral 30. The tool 30 includes a base portion, generally identified by the numeral 31, and a cam 32. A rod 33 carried by the base portion slidably mounts the cam 32 for axial movement relative to the base portion.

Although the tool 30 may be of varied designs, basically the base portion 31 includes a base 34 having a plurality of resilient fingers 35 extending upwardly therefrom in flared relation. Thus, the base portion 31 corresponds generally to the lower portion of either the plug 19 or the plug 26.

After the upper part 20 of the bag 17 has been wedged onto the upper part of the base portion 31, the product bag 17 is inserted into the can 10 utilizing the tool 30. After the tool and product bag have seated in the valve cup receiving opening 15 and against the curl 16, as shown in FIG. 6, the cam 32 is moved downwardly so as gradually radially outwardly to bend the fingers 35 in the manner shown in FIG. 7. The fingers 35, in turn, radially outwardly deform and stretch the bag upper part 20 around the curl 16 to interlock the bag upper part 20 with the curl, as shown in FIG. 7.

After the product bag 17 has been interlocked with the curl 16, the cam 32 is moved upwardly on the shaft 33 and the resilient fingers 35 regain their original shape. The tool 30 may now be removed and the aerosol package completed in the manner described above.

Reference is now made to FIG. 8 wherein still another form of tool is illustrated, the tool being generally identified by the numeral 40. The tool 40 is in the form of a tube or sleeve 41 of resilient deformable material. The lower end of the sleeve 41 is constrained by a plug member 42 which carries a rod 43. A similar constraining plug 44 engages the upper end of the sleeve 41 and is slidable on the rod 43. A cam element 45 is pivotally mounted on the upper end of the rod 43 by means of a transverse pin 46 and has a cam surface 47 which engages the upper plug 44. The cam member 45 may be of a bifurcated construction so as to straddle the upper end of the rod 43 and is provided with a suitable actuator 48.

The sleeve 44 may be of a cylindrical construction, although it is preferred that the outer surface thereof adjacent the bottom part by upwardly flared as at 50 so that when the upper part 20 of the product bag 17 is engaged over the sleeve 41, it will be slightly stretched and held in place so that the tool 40 may be utilized to position the product bag 17 within the can 10 in the same manner as described above.

After the tool 40 and the product bag have become wedged in the valve cup receiving opening 15 as shown in FIG. 8, the cam 45 is actuated so as to force the plug 44 downwardly toward the plug 42. This requires a foreshortening of the sleeve 41 which is effected by a buckling of the sleeve as shown in dotted lines. The radially outward buckling of the sleeve 41 serves radially outwardly to stretch and deform the bag upper part 20 around the curl 16 in the same manner as described with respect to the other tools. If desired, the internal wall of the sleeve 41 may be varied in thickness so as to control the buckling of the sleeve.

After the product bag has been applied to the can, the cam 45 is returned to its original position and the tool 40 is readily withdrawn, after which the aerosol package is completed in a conventional manner.

Although several embodiments of the tool for applying the product bag to the can have been illustrated, it will be seen that the tools all employ basically the same method, and it is to be understood that minor variations may be made in both the tool construction and the method of applying the product bag without departing from the spirit and scope of the invention as defined by the appended claims.

I claim:

1. A method for applying a product bag to an aerosol can of the type including a valve cup receiving opening and seat defined by a curled lip, comprising: inserting a generally cylindrical product bag having a diameter corresponding to the diameter of said valve cup receiving opening in the aerosol can with an upper portion of the product bag extending through the valve cup receiving opening and above the curled end, inserting a resiliently deformable flaring tool portion within an open end of said bag, pressing and radially outwardly expanding the product bag upper portion over and around the curled lip with said tool and deforming said tool portion as said bag is pressed about said curled lip by said tool.

2. The method of claim 1 wherein the product bag open end is first engaged over a flared portion of said tool to initially radially outwardly expand the product bag upper portion to a size greater than said cup receiving opening.

3. The method of claim 1 wherein the product bag open end is first engaged over a flared portion of said tool to initially radially outwardly expand the product bag upper portion to a size greater than said cup receiving opening, after which the tool and the product bag upper portion are seated on the curled lip, followed by said utilization of the tool to radially outwardly deform the product bag upper portion and effect said expanding of the product bag upper portion around the curled lip.

4. The method of claim 1 wherein the tool is deformed to deform the product bag by axially compressing the tool.

5. The method of claim 1 wherein the tool is deformed to deform the product bag by internally pressurizing the tool.

6. The method of claim 1 wherein the tool is deformed to deform the product bag by axially foreshortening the tool.

7. The method of claim 1 wherein the tool is deformed to deform the product bag by radially outwardly deforming the tool.

8. The method of claim 1 wherein the tool is deformed to deform the product bag by radially outwardly deforming the tool through internal pressure.

9. The method of claim 1 wherein the tool is deformed to deform the product bag by radially outwardly deforming the tool by a camming action.

* * * * *